INVENTORS
EVERETT G. BROOKS
JOHN W. MC CULLOUGH
BY Richard H. Smith
ATTORNEY

Oct. 7, 1969 E. G. BROOKS ET AL 3,471,853

ANALOG TO DIGITAL CONVERTER

Filed Feb. 23, 1966 4 Sheets-Sheet 2

3,471,853
ANALOG TO DIGITAL CONVERTER

Everett G. Brooks and John W. McCullough, Rochester, Minn., assignors to International Business Machines Corporation, Armonk, N.Y., a corporation of New York Filed Feb. 23, 1966, Ser. No. 529,471
Int. Cl. H04l 3/00; H03k 13/00
U.S. Cl. 340—347 14 Claims

ABSTRACT OF THE DISCLOSURE

A plurality of analog input terminals are multiplexed with a central control unit. A single comparator and a single digital to analog converter in the control unit sequentially receive each analog input and the digital output of a counter associated with each input. An oscillator in the control unit transmits drive pulses to the low-order stage of each counter whenever the comparator indicates that the converted counter output is less than its associated analog input signal. The counters are advanceable in a single direction only, for storing the peak value of each analog input. Logic circuitry classifies a counter output as a peak, and gates it to a register, when two successive lower values are detected during subsequent sampling intervals. Additional logic disables each counter for several intervals after each peak has been detected.

This invention relates to analog to digital converters and, more particularly, to an analog to digital converter adapted to perform peak detection and measurement for a plurality of analog inputs.

An illustrative application for a peak detecting and measuring analog to digital conversion scheme is in the provision of digital readouts for automatic analyzing systems of the type commonly employed in medical analysis. A common type of automatic analyzing system includes a rotatable table supporting in individual containers a purality of liquid biological specimens, e.g., blood. As the table rotates, a dipping device removes a sample of specimen from each container and deposits it in a tubular conduit. The specimens are separated from one another in the conduit by an interspersing agent such as air or water. The train of interspersed specimens flows through the conduit and past a photoanalysis station where a beam of light of a given frequency or frequency band is directed through the liquid. A photodetecting device receiving the light passed by the liquid gives an electrical output signal having a magnitude which is representative of certain characteristics of the liquid such as, for example, amino acid concentration.

The movement of the specimens past the photodetector causes the output thereof to exhibit a series of peak magnitudes, one peak associated with each specimen. The valleys between the peaks are produced when the beam passes through the interspersing agent while the peaks themselves are produced when the beam passes through the pure specimen located in the center of each sample. The slopes of the waveform between the peaks and the valleys are generated as the beam scans the intermixed specimen and interspersing agent found at the interface therebetween. Of course, the height of each peak represents the relevant information sought since it is generated by pure specimen. Thus, to provide a useful output from the automatic analyzing system, conversion means must be connected to the output of the photodetector to detect, measure and identify each peak as it occurs. Often it is desirable to connect the photodetector outputs of several analyzing systems into a conversion device having multi-input capabilities. Such a device must therefore be capable of detecting and measuring each peak while providing the necessary identification data to relate each output to a specific analyzing system and to a specific specimen handled by that system.

Previous to the present invention the desired peak measurements were obtained by recording the photodetector output waveforms of several analyzing systems on a multi-channel strip chart recorder. The peaks of each waveform on the chart were then visually counted and manually measured by an operator to derive the desired digital outputs and identifying data. Needless to say this system is tedious, not particularly accurate and extremely slow.

Another way which has been devised to derive the desired output data is to multiplex the analog outputs of the several analyzing systems into a conventional analog to digital converter. Digital outputs from the ADC are placed into temporary storage where they are segregated according to the system from which they came. Peak detection is performed by comparing each digital output with the previously generated digital output from the same system and when this digital comparison indicates that a peak value has been obtained, that value is recorded or displayed with the proper identifying data. This scheme calls for a relatively sophisticated and complex digital storage arrangement and, further, the digital comparison operation required for peak detection calls for relatively complex circuits which must either be duplicated for each analyzing system or time-shared to provide the desired multiple comparisons. The cost of this essentially all-digital scheme is appreciable.

Still another scheme for obtaining the desired digital peak outputs is to provide purely analog peak direction for the analog outputs of each of the several analyzing systems. Analog to digital conversion is performed only upon the analog voltages designated as the peak voltages. It is readily apparent that the main drawback of this scheme is the requirement for multiple analog storage and comparison means. These devices are not suited for use in low cost, low frequency systems.

It is therefore an object of the present invention to provide an improved, low cost analog to digital converter incorporating means for peak detection.

Another object is to provide an improved, low cost analog to digital converter for generating digital conversions for a plurality of analog input signals.

A further object is to provide a multi-input, peak detecting analog to digital converter having means for identifying peaks in accordance with the input from which they were derived and in accordance with the sequence in which they are presented at that input.

Yet a further object is to provide an improved peak detecting analog to digital converter having means for segregating true peaks from "false" peaks.

Still a further object is to provide a peak detecting analog to digital converter having means for asynchronously transferring digital outputs to an external utilization device.

In accordance with the present invention, a plurality of analog input terminals are sequentially interconnected for time-shared operation with a central control unit. Analog to digital conversion is performed in the system in accord with the "feedback counter" A–D conversion principle. The low-cost A–D components, the counters, are provided on a per-terminal basis and the high-cost components, the digital to analog converter, comparator, polarity detector and the pulse generator are located in a central control unit for time-shared operation with the terminals. Peak detection is simply and inexpensively implemented by rendering the terminal-based counters advanceable in a single direction only.

An additional feature of the invention is directed to validating means for identifying a digital conversion value as a true peak only if the following two consecutive samples of the input yield values which are less than the value being validated. A further feature is directed to means provided at each input terminal for counting the peaks occurring at each terminal in order that each peak may be identified as to its order of occurrence. A still further feature is directed to buffer storage means controlled by an external utilization device in a manner such that the flow of peak output data to that device from the A–D system is accomplished on an asynchronous basis.

The foregoing and other objects, features and advantages of the invention will be apparent from the following more particular description of a preferred embodiment of the invention, as illustrated in the accompanying drawings.

In the drawings:

FIG. 1 is a schematic diagram illustrating the overall system arrangement of a four-terminal analog-digital conversion device in accordance with the invention.

FIGS. 2*a* and 2*b* are schematic circuit diagrams which, taken together with 2*a* positioned above 2*b*, show the circuit details of the system depicted generally in FIG. 1.

GENERAL DESCRIPTION

Figure 1:
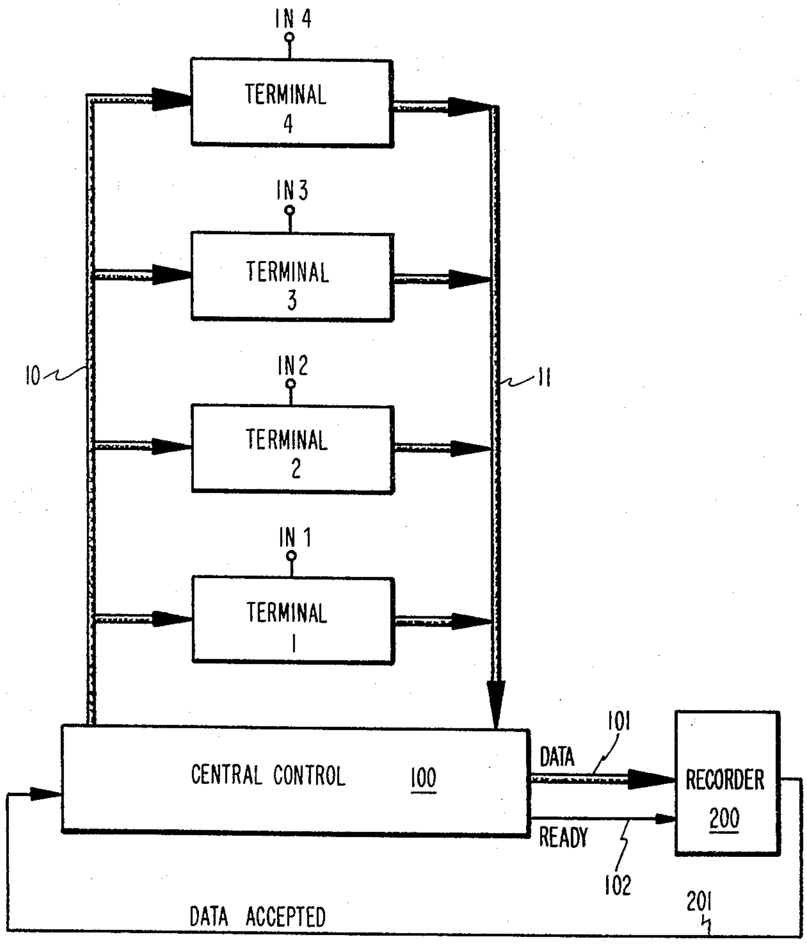

The overall arrangement of a four-terminal peak detecting and measuring system in accordance with the principles of the invention is illustrated in FIG. 1. A central control unit 100 transmits selection and control signals to the four terminals 1–4 via an eight-wire cable 10. Peak data output and control signals are transmitted from the terminals 1–4 back to central control unit 100 via a fifteen-wire cable 11. The peak data transmitted on the cable 11 includes a binary representation of the magnitude of the peak as well as a binary representation of the peak count, i.e., the sixth, seventh, etc., peak to occur at that terminal. Each of the terminals 1, 2, 3 and 4 has an analog input IN 1, IN 2, IN 3 and IN 4, respectively. An independent analog input signal, such as may be generated by the photodetector of an individual automatic analyzing system, is applied to each one of these input terminals.

The terminals are polled in a regular sequence by stepping switch means located in control unit 100 and data can be transmitted from the terminals to the unit 100 only during the time interval when the terminal is "up," i.e., when it is being polled. Peak output data transmitted by the terminals to the unit 100 is transferred via an output cable 101 from the unit 100 to a recorder 200. Additional data identifying the terminal from which the peak was transmitted is also included in the data transferred on cable 101. This additional data is generated within control unit 100. The data transfer operation over cable 101 is asynchronous in nature, meaning that it is capable of taking place at a time which has practically no set relationship with the time sequence of the operation of the unit 100 or terminals 1–4. In connection with this asynchronous transfer operation a READY signal is transmitted on line 102 from the unit 100 to the recorder 200 and a DATA ACCEPTED signal is transmitted from the recorder 200 back to the unit 100. The former signal indicates that new peak data is available in the unit 100 and the latter signal indicates that the recorder 200 has taken this data.

A–D conversion is performed in the system in accordance with the "counter feedback" conversion principle. A separate data counter is provided at each of the terminals 1–4 and a digital to analog converter (DAC), differential amplifier, polarity detector and pulse generator are provided in the central unit 100. As each terminal is polled, its counter and analog input signal are connected into an A–D feedback loop with the circuits of the unit 100. The analog signal is connected to one input of the differential amplifier and the counter output is connected to the DAC network in turn connected to the other input of the amplifier. If the amplifier output indicates that the analog signal is greater than the counter output, the pulse generator is then connected to the counter input to advance the counter until its output converges on the analog input. If the amplifier output is of the opposite polarity, counter advance is inhibited and the counter output is identified as a tentative peak. Peak validating and readout procedures, described in detail subsequently, are then initiated. At the end of the polling or sampling interval for a terminal, the counter and analog input therefor are disconnected from the A–D conversion loop and the counter and analog input of the next terminal in the polling sequence are connected.

DETAILED DESCRIPTION

Figure 2A:
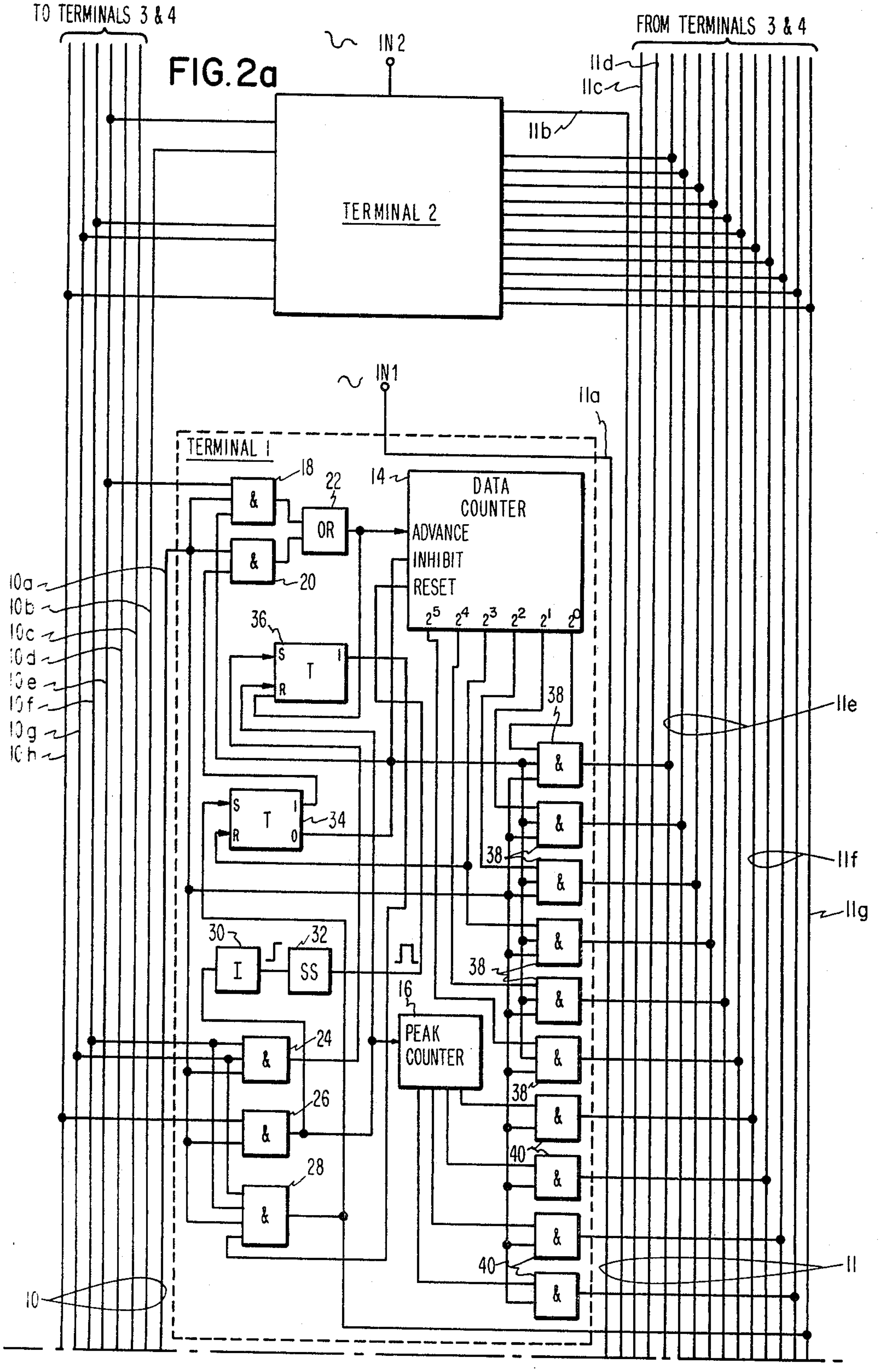
Figure 2B:
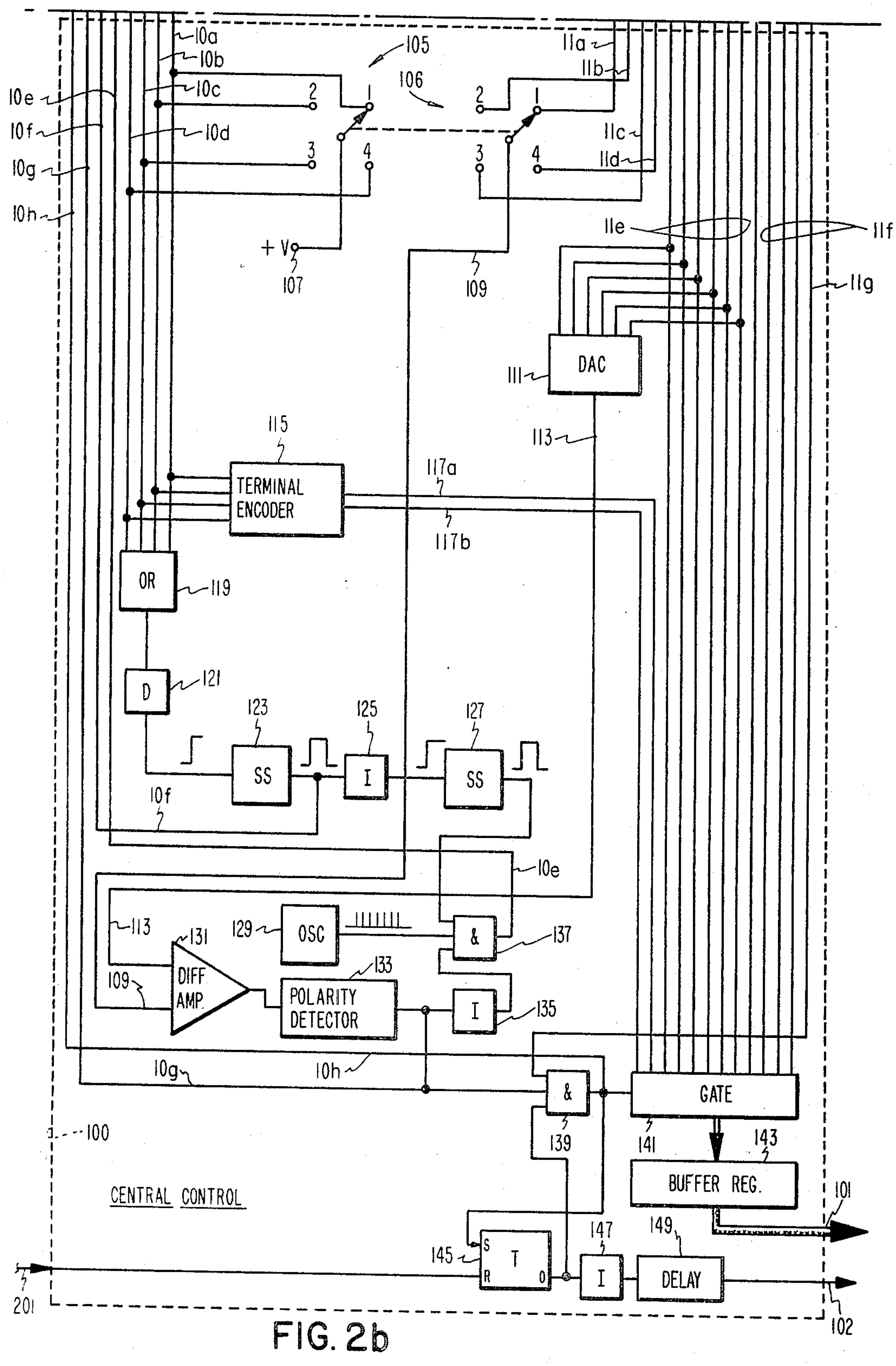

Referring now to FIGS. 2*a* and 2*b* a detailed description of one embodiment of the system of the invention is hereinafter given. The circuit of terminal 1 is shown within the dashed box in FIG. 2*a*. The circuits of terminals 2, 3 and 4 are identical and therefore are not separately described.

Terminal 1 comprises five input AND circuits 18, 20, 24, 26 and 28 and ten output AND circuits 38 and 40. All of these AND circuits are adapted to be partially conditioned by an input signal on input line **10*a* of cable 10. As will be subsequently described, line 10*a* receives input signals from the terminal selection stepping switch in control unit 100. All control signals from unit 100 are transmitted through the input AND circuits and all digital output and control signals from terminal 1 are transmitted to the unit 100 via the output AND circuits. The terminal is thus adapted to communicate with the unit 100 only when it is being polled by a signal on line 10*a***.

Input IN 1 of terminal 1 receives an analog input signal and transmits it directly onto line **11*a* of output cable 11. As will be described in detail subsequently, line 11*a* is connected to an analog input selection switch in control unit 100 connected to operate conjointly with the terminal selection switch therein such that during the time that a terminal is being polled its analog input signal is connected to the A–D conversion circuits in the unit 100. The analog input signals applied to the other three terminals 2–4 are individually transmitted to the analog signal selection switch by the wires 11*b*, 11*c* and 11*d*, respectively, of cable 11. The remaining lines of cable 11, lines 11*e*, 11*f* and 11*g*, are utilized in common, i.e., time-shared, by the four terminals. Similarly, the four lines 10*a*, 10*b*, 10*c* and 10*d* of cable 10 are provided on per terminal basis to convey polling signals to the four terminals while lines 10*e*–10*h*** are time-shared.

Digital approximations of the magnitude of the analog input signal at IN 1 are stored in deta counter 14. The counter 14 is a conventional six-position binary counter having outputs $2^0$ through $2^5$ which are collectively adapted to represent the decimal digital values 0 through 63 in accordance with conventional binary notation. Each negative-going ADVANCE input to the counter advances it one count increment. ADVANCE inputs are supplied either by AND 18 or AND 20 acting through an OR circuit 22. AND 18 is activated by a coincidence of positive input signals on lines 10*e*, 10*a* and a line from the 0 output of a bistable multivibrator trigger circuit 34. This latter line also supplies INHIBIT signals to the counter 14. As will be described subsequently, such signals prevent the switching of the $2^4$ counter output from 0 to 1 under certain circumstances. AND 20 is activated by a coincidence of positive signals on line 10*a* and on the 1 output line of trigger 34.

Counter 14 is reset to an all-zero state by an input supplied to its RESET input from a singleshot multivibrator circuit 32. Digital signals representative of the output state of the counter are transmitted to control unit 100 via lines 11*e* of cable 11 from output AND circuits 38. Each of these AND circuits is conditioned to transmit a counter output upon coincidence of input signals on line 10*a* and on the 0 output line from trigger 34.

A "peak validating" bistable multivibrator trigger circuit 36 is settable to its 1 output state by a negative-going AC signal applied to its set input terminal S from AND circuit 24. Trigger 36 is resettable to its *o* output state by either a negative going input transistion from AND circuit 26 or by a positive level input signal applied to the input terminal R from OR circuit 22. The function of trigger 36 is to prevent the transfer of digital information from counter 14 to the buffer storage register in control unit 100 until the digital data stored in the counter is validated as a true peak. A digital output is validated as a true peak when the magnitude of the analog input signal at terminal IN 1 is detected to be less than the magnitude represented at the counter output during both of the two sampling intervals immediately following the interval in which the counter output to be validated was established.

Trigger circuit 34 is provided to inhibit the counter 14 from functioning as an analog to digital conversion counter for the fifteen sampling intervals following the interval in which a validated peak output was transferred from the counter to the control unit buffer storage register. This inhibiting action is initiated when trigger 34 is set by a negative-going transition applied to its S input from AND 28. Ths causes the 0 output of the trigger to drop to a negative level, inhibiting input AND 18 and output AND's 38 and activating the INHIBIT input to the counter. The signal on the 1 output of the trigger enables input AND 20 to transmit ADVANCE signals to counter 14 through OR 22. These ADVANCE signals are generated once per sampling interval when the input on line 10*a* drops. The counter counts these signals and as it is in the process of switching to a count of 16, its $2^3$ output line changes from a 1 to a 0. This supplies a resetting input to trigger 34. Resetting of the trigger causes its 0 output to go positive, removing the inhibiting inputs from AND's 18 and 38. The effect of the negative INHIBIT input to the counter is to prevent the counter from completing its advance to the count of 16. Thus the $2^4$ counter output line does not come up and the counter output is left in an all-zero state. Terminal 1 is thus prepared to be re-inserted into the A–D loop of the system to begin searching during the next sampling interval, for a new peak at input IN 1.

Removal of the counter from the A–D conversion loop for fifteen sampling intervals following transmission of a peak output therefrom keeps the counter from performing its A–D conversion function during that period in which the analog signal at input IN 1 exhibits a negative slope. Owing to the manner in which it is employed as a peak detecting A–D counter, the counter 14 would erroneously indicate a peak every third sampling interval if allowed to operate during this period. In the present embodiment of the invention wherein the analog inputs are generated by automatic fluid analyzing systems, the fixed, fifteen interval period is sufficient since the time duration between analog input peaks is relatively constant due to the predetermined, regular spacing of the liquid samples in the transporting conduit.

A peak counter 16 is provided at the terminal to keep track of the number of peaks detected in the analog input. Counter 16 is a four-position binary counter which is advanced one increment each time a negative-going input pulse is applied to its input from AND circuit 26. Decimal digital values ranging from 1 to 16 may be represented at the counter output. Each of the counter output lines is connected to an input of one of the output AND circuits 40 to enable transmission of the peak number back to central control unit 100 via lines 11*f* of cable 11.

The circuit details of central control unit 100 are shown in FIG. 2*b*. A pair of four position stepping switches 105 and 106 are coupled for tandem operation. Switch 105 is the terminal selection switch and switch 106 is the analog input selection switch. The four stationary contacts of each switch are respectively associated with the four system terminals 1–4. The rotatable armatures which are connected to the common contacts of each switch are coupled together so that as they are rotated they simultaneously engage the corresponding stationary contacts of each switch. Switch 106 functions to sequentially transmit the analog input signals from the four terminals 1–4 to a first input 109 of differential amplifier 131. To this end the four stationary contacts 1–4 of switch 106 are connected to the four lines 11*a*, 11*b*, 11*c* and 11*d*, respectively, of cable 11 and the switch armature is connected to differential amplifier input line 109.

Switch 105 functions to poll the four terminals 1–4. A voltage source +V applied to terminal 107 is supplied to the rotating armature of the switch and the four stationary contacts are connected to the four lines 10*a*, 10*b*, 10*c* and 10*d*, respectively, of cable 10. As previously discussed, these four lines transmit the polling signals generated by switch 105 to the input and output AND circuits of the four terminals. Drive means (not shown) are supplied to step the armatures of the two switches. The stepping frequency is determined by the analog input sampling frequency desired and by the number of input terminals to be sampled.

The polling signals generated by switch 105 are also transmitted to the inputs of a terminal encoder circuit 115 and an OR circuit 119. The former circuit is a conventional code translating circuit having a pair of binary output lines 117*a* and 117*b*. The four combinations of binary output signals available on these lines are employed to identify the four system terminals. The terminal identification code thus generated is transmitted to the input of gate circuit 141 to become a part of the output data transmitted on cable 101 to the recorder 200.

OR circuit 119 generates a positive-going output signal at the start of each sampling interval. This output is transmitted through a delay circuit 121, the purpose of which is explained in the discussion of operation below, to the input of a single-shot multivibrator 123. Single-shot 123 responds with a positive output signal of fixed duration. This output is carried on common line 10*f* to the system terminals where it is employed to partially condition the input AND circuits 24 and 28 of terminal 1 and the corresponding AND circuits in terminals 2–4. The output of single-shot 123 is also transferred through an inverter circuit 125 to the input of a second single-shot multivibrator 127. Inverter 125 causes a positive-going transition to appear at the input of single-shot 127 in response to the fall of the output pulse from single-shot 123. This triggers a positive pulse of fixed duration from the output of single-shot 127. This output is fed to one input of an AND circuit 137.

Digitally-coded output signals from the terminal data counters are received on common lines 11*e* and are transmitted to the inputs of a conventional digital to analog conversion (DAC) network 111 and to gate circuit 141. These binary-coded inputs operate the input switches in DAC circuit 111 in a well known manner such that an analog voltage is generated on output line 113, the magnitude of the voltage being proportional to the value represented by the digital input. Output line 113 is connected to the second input of differential amplifier 131. It is thus seen that operation of the stepping switches 105 and 106 causes the differential amplifier 131 to sequentially receive concurrent pairs of analog input signals, each signal pair representing the magnitude of the analog input signal and the analog equivalent of the counter output for one of the system terminals 1–4. The output of differential amplifier 131 is fed to a conventional polarity detecting circuit 133 which functions to produce a positive level output signal when the level of differential amplifier input line 113 exceeds the level on input line 109. A negative level output signal is produced by the circuit 133 when the signal on line 109 exceeds the signal on line 113.

The output from polarity detection circuit 133 is applied through an inverter 135 to a second input of AND circuit 137, to line 10*g* and to an input of an AND circuit 139. Common line 10*g* transmits the polarity signal to the inputs of AND's 24 and 28 of terminal 1 and to the inputs of the corresponding AND's of terminals 2–4.

AND 137 receives its thrd input from an oscillator 129 which continually generates a train of short duration pulses. The output of AND circuit 137 is carried by common line 10*e* to the terminals where it is applied to the input of AND circuit 18 of terminal 1 and the corresponding AND circuits of terminal 2–4. This output, consisting of a series of pulses corresponding to the output of oscillator 129 appears on line 10*e* only during coincidence of an output from single-shot 127 and a negative output from polarity detector 133. As has been mentioned, a negative output from polarity detector 133 indicates that the analog signal on input line 113 to differential amplifier 131 is less than the magnitude of the analog signal on amplifier input line 109. This indicates that the magnitude represented at the output of the data counter of the terminal then being sampled is less than the magnitude of the analog input signal being received by the same terminal. This condition thus causes oscillator pulses to be transmitted to the ADVANCE input of the terminal data counter during the output period of single-shot 127. Each oscillator pulse advances the data counter one binary increment, causing the output thereof to increase, thereby increasing the analog signal on input line 113 to amplifier 131. When the terminal data counter is driven by the oscillator pulses to a point where the inputs to amplifier 131 are substantially equal, the output of polarity detector 133 switches to a positive level, causing inverter 135 to decondition AND circuit 137, blocking further transmission of oscillator pulses to the terminal counter.

The output signal from polarity detector 133 is also transmitted to an input of an AND circuit 139. The other two inputs to AND 139 are received from line 11*g* of cable 11 and from the 0 output side of a bistable trigger circuit 145. When AND 139 is activated it sends a positive signal on line 10*h* to activate terminal AND circuit 26 and further acts to enable gating circuit 141, causing the digital information then present on lines 117*a*, 117*b*, 11*e* and 11*f* to be transferred into buffer storage register 143. This data resides in register 143 until it is taken, over output cable 101, by recorder 200 (FIG. 1). Trigger 145 permits this data transfer operation to be carried out asynchronously. When the gating pulse from AND 139 terminates, closing gate 141 after the data has been gated into register 143, a negative-going transition is applied to the set input of trigger 145, switching the 0 output thereof to a negative level. This deconditions AND 139 and inhibits the generation of any further gating pulses. When the data in register 143 has been accepted by recorder 200, a positive DATA ACCEPTED pulse appears on input line 201 and resets trigger 145. This once again restores the trigger output to a positive level, removing the inhibiting input from AND 139 and allowing further gating pulses to be generated thereby when required.

When peak data from a terminal data counter is not transferred to register 143 because of non-transferal of previous data from that register to the recorder 200, the terminal AND circuit corresponding to AND 28 sends a signal to AND 139 at the beginning of each ensuing sampling interval until the peak data is gated into the register 143. The amount of time allowable for any such delay is limited due to the fixed, fifteen interval period during which the terminal data counter remains inoperative as a peak detector following the transferal of peak data therefrom. Acceptance of data by the recorder 200, while asynchronous, must still occur frequently enough to permit each terminal data counter to be re-inserted into the system as a peak detecting counter in ample time to detect the next peak occurring at its terminal. For example, if the average time between peaks at a terminal is 30 sampling intervals, the delay in transferring peak data from the counter should not extend to more than six or seven sampling intervals, so that the counter is restored to its peak detecting function at least six or seven intervals prior to the time at which the next peak is expected. Any greater delay could cause the terminal counter to miss the next peak.

As is apparent from the above description, the type of analog to digital conversion performed by the system of the invention is the "counter feedback" type wherein the terminal data counter of the terminal being sampled is driven upwards by counter drive pulses from oscillator 129 until the counter output magnitude matches the magnitude of the associated analog input signal. This condition is detected by differential amplifier 131 and polarity detector 133, the latter being effective to thereafter inhibit further transmission of drive pulses to the terminal data counter. Of course, since the data counter cannot be incremented downwardly, an analog input signal which at the beginning of the sampling interval has a magnitude less than the magnitude digitally represented at the counter output has no effect upon the counter. This condition identifies the digital value then in the data counter as a tentative peak.

Operation—Response to a normal peak

Figure 3:
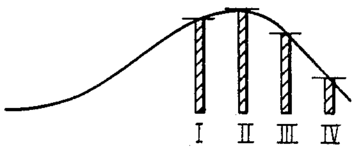
FIG. 3 is a schematic diagram showing an analog input signal such as may appear at one of the system input terminals and further illustrates the time-orientation of four sampling intervals executed in accordance with the principles of the invention.
Figure 4:
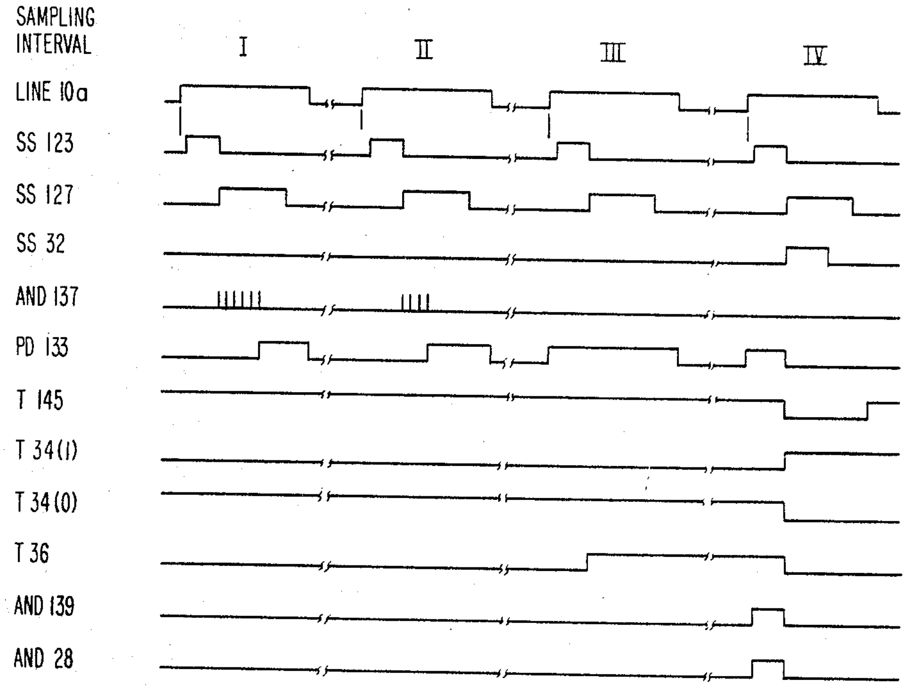
FIG. 4 is a waveform diagram showing the timing relationship between the outputs of various circuit components of FIGS. 2*a* and 2*b* during the four sampling intervals indicated in FIG. 3.

With reference now to FIGS. 2, 3 and 4, the operation of the system in detecting and reading out the digital value of a peak occurring in the analog input signal to terminal 1 is hereinafter described. It is to be understood that the same operation pertains for peak detection at any of the remaining terminals 2–4. The waveforms of FIG. 4 represent the time sequence of operation of the indicated circuit components during the four consecutive sampling intervals I–IV illustrated in the schematic diagram of FIG. 3. FIG. 4 is compressed in time, the broken lines between each sampling interval representing the intervening period when terminals 2, 3 and 4 are polled.

Sampling interval I is initiated when the armatures of scanning switches 105 and 106 engage the stationary contacts associated with system terminal 1. When this occurs the positive voltage on terminal 107 is transmitted to line 10*a* causing the voltage on that line to shift upwardly (FIG. 4). This signal on line 10*a* partially conditions input AND circuits 18, 20, 24, 26 and 28 and further partially conditions output AND circuits 38 and 40. Since trigger 34 is initially in a reset condition, output AND's 38 immediately transfer the digital value present at the outputs of data counter 14 onto common lines 11*e* of cable 11. DAC network 111 is thus activated substantially at the beginning of sampling interval I to produce an analog signal on line 113 corresponding to the digital value at the output of data counter 14. Likewise, the analog input signal at input IN 1 is transmitted directly on line 11*a* of cable 11 to switch 106 whereupon it is relayed over line 109 to the input of amplifier 131. This also occurs substantially at the beginning of the sampling interval. Since sampling interval I takes place during a time when the analog input signal is rising (FIG. 3) the analog signal on input line 109 of amplifier 131 initially exceeds the analog signal on input line 113. Thus the output of polarity detector 133 at the beginning of interval I is a negative level signal. This negative signal is transmitted on line 10*g* to inputs of terminal 1 AND circuits 24 and 28, inhibiting the generation of any output signals therefrom.

The positive transition occurring on line 10*a* at the beginning of interval I, after passing through delay circuit 121, arrives at the input of single-shot 123 to trigger an output therefrom (FIG. 4). At the termination of this output, single-shot 127 generates a positive pulse of somewhat longer duration (also see FIG. 4). This output coincides with the positive output from inverter 135, produced by virtue of the negative output from polarity detector 133, to enable AND circuit 137 (FIG. 4) to transmit a pulse train from oscillator 129 onto line 10*e*.

The oscillator pulses are received by input AND 18 of terminal 1 and, since input line 10*a* is positive and trigger 34 is in a reset condition, the AND circuit transmits the oscillator pulses to OR 22 which in turn feeds them to the input of data counter 14. Counter 14 advances, causing the analog input signal on differential amplifier input line 113 to correspondingly increase in magnitude. When the value represented at the counter output matches the magnitude of the analog input signal, the output of polarity detector 133 goes positive (FIG. 4) deconditioning AND 137 to block the transmission of further counter drive pulses. It is to be noted that although this positive transition at the output of the polarity detector is transmitted to the input of terminal AND circuits 24 and 28 over line 10*g*, no outputs are generated by those AND circuits since line 10*f* is then at a negative level owing to the termination of the output from single-shot 123. Thus, during sampling interval I the only activity generated by the system is the advancement of the data counter 14 to approximate the level of the analog signal at input IN 1.

During sampling interval II a still greater analog input magnitude is encountered (FIG. 3) and thus the operation of the system is exactly the same as described above for sampling interval I. This fact is readily apparent by comparing the waveform sequence for sampling intervals I and II shown in FIG. 4.

During sampling interval III, however, a different situation occurs. As shown in FIG. 3, a peak in the input signal has been passed and the signal level during interval III is less than that during interval II. This means that the output of polarity detector 133 goes positive substantially at the outset of the sampling interval (FIG. 4). AND 137 is thus immediately disabled, preventing any advancement of data counter 14. Also, the resulting positive signal on line 10*g* conditions input AND's 24 and 28 at substantially the same time that the positive signal on line 10*a* is applied to the inputs thereof. This means that as soon as the output of delayed single-shot 123 goes positive, AND 24 issues a positive signal to the S input of peak validating trigger 36. When this output goes negative at the termination of the pulse from single-shot 123, trigger 36 is set causing the level at its output line to go positive (FIG. 4). This output in turn conditions the fourth input of AND 28. AND 28, however, cannot produce an output at this time since the output of single-shot 123 has fallen. This completes the circuit activity for sampling interval III.

The purpose for delay circuit 121 (FIG. 2*b*) is now apparent. Since a positive output from polarity detector 133 substantially at the outset of a sampling interval means that a peak was detected during a preceding interval, it is important that the initial reading from polarity detector 133 be accurate. The operation of single-shot 123 is delayed by the circuit 121 for a period long enough to permit settling of circuit transients caused at the beginning of the sampling interval by the application of a new set of input voltages to the circuits of control unit 100. Thus, due to delay circuit 121 AND circuit 24 cannot be activated until a settled output is available from the polarity detector.

At the outset of sampling interval IV polarity detector 133 again immediately goes positive due to the fact that the level of the analog input signal is again lower than the level encountered during sampling interval II, which level is being preserved at the outputs of data counter 14. Since trigger 36 was set during interval III it remains set and its output is at a positive level at the beginning of interval IV (FIG. 4). Thus, the positive level signals present on line 10*a* from selection switch 105, on line 10*f* from the output of delayed single-shot 123, on line 10*g* from polarity detector 133 and on the output line from trigger 36 coincide to activate AND circuit 28 (FIG. 4). The leading edge of this output signal is transmitted via line 11*g* of cable 11 to the input of AND circuit 139 in the central control unit, causing an output to be generated therefrom (assuming trigger 145 to be in a reset state due to a previously culminated data transfer operation). This signal from AND 139 opens gate circuits 141 to transfer the digital data on lines 117*a* and 117*b* (identifying terminal 1), the digital data on lines 11*e* (representing the peak value at the output of data counter 14) and the digital data on lines 11*f* (representing the number of the peak) into the buffer register 143. The positive signal issuing from AND 139 is also transmitted via line 10*h* to the input of terminal AND circuit 26, activating the same to produce a positive output signal.

When the output of delayed single-shot 123 goes negative, the output signals from AND's 28 and 139 drop (FIG. 4) and the resultant negative-going transitions cause a plurality of events to occur.

The negative transition at the output of AND 139 is applied to the S input of trigger 145 and causes the trigger to switch to its set state, dropping the level of its output line. This negative-going output is inverted by an inverter 147 to a positive-going output which, after a period of delay established by delay circuit 149, is transmitted via output line 102 to recorder 200, informing the same that new data has been placed in buffer register 143 and is ready to be taken. The delay of circuit 149 is necessary to allow time for the circuits of register 143 to settle. Also, the negative level appearing at the output of trigger 145 deconditions AND circuit 139 to prevent the gating of any further data into the buffer register until the data just stored therein is taken by the recorder 200.

The negative-going transition appearing at the output of AND 139, being transmitted via line 10*h*, causes a similar transition to appear at the output of terminal AND circuit 26. This signal triggers single-shot multivibrator 32 through inverter 30 to cause data counter 14 to be reset to an all-zero state. The signal also advances peak counter 16 one binary increment and resets peak validating trigger 36.

The negative-going transition appearing at the output of AND 28 is transmitted to the S input of trigger 34, setting the trigger and causing its 1 output to go positive and its 0 output to go negative. The former of these two outputs activates AND circuit 20. The latter output deconditions AND circuits 18 and 38 to prevent the transmission of any counter outputs back to central control unit 100 and to prevent the advancement of data counter 14 by any pulses which may appear on line 10*e*. The termination of the terminal selection signal on line 10*a* at the end of sampling interval IV causes the output of AND circuit 20 to drop and the resulting negative-going input transition is transmitted through OR 22 to advance counter 14 to a binary count of 1. A similar signal increments the counter at the termination of each subsequent sampling interval.

The negative-level signal present at the 0 output of trigger 34 during the time the trigger is in its set condition is also transmitted to the INHIBIT input of data counter 14. This input is applied to the AND circuit (not shown) which feeds the input to the $2^4$ stage of the counter. This means that so long as trigger 34 remains set, the negative-going transition resulting from the fall of the $2^3$ counter output (as the counter attempts to switch from a count of 15 to a count of 16) cannot be gated to the input of the $2^4$ counter stage and the counter, instead of advancing to a count of 16, reverts to a count of 0. The negative transition generated by the fall of the $2^3$ output is used to reset trigger 34. Resetting of trigger 34 re-conditions AND's 18 and 38. Thus, trigger 34 cooperates with the counter 14 to keep terminal 1 out of the A-to-D loop of the system for fifteen sampling intervals following the interval in which peak data is gated from the counter to the register 143. At the beginning of the sixteenth interval, AND's 18 and 38 are re-condtioned and the counter is in a zero state, enabling the system to begin searching for the next peak in the signal at input IN 1.

It is to be noted that since peak counter 16 is advanced only after its output data has been gated into the buffer register 143, the counter 16 must begin its count at 1 rather than 0 in order to accurately reflect the peak number. The reset means (not shown) employed to reset counter 16 prior to setting the system into operation must function accordingly. Of course, reset to 0 would be possible by modifying the circuits of the counter 16 to respond to positive-going input drive pulses rather than negative-going input drive pulses.

Operation—Response to a false peak

Figure 5:
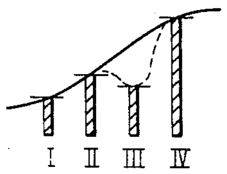
FIG. 5 is a schematic diagram showing four sampling intervals executed on an analog input during the occurrence of a "false" peak.
Figure 6:
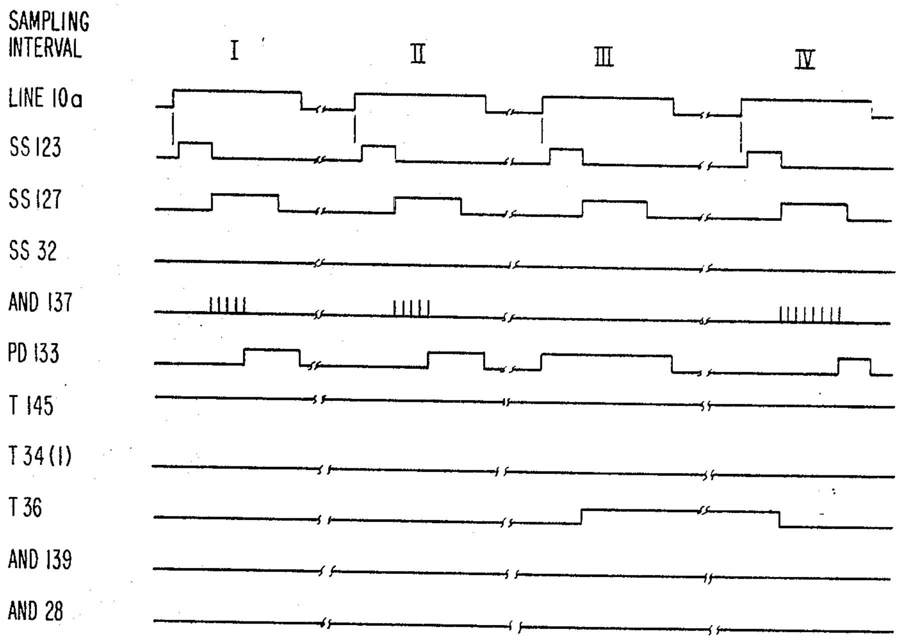
FIG. 6 is a waveform diagram illustrating the timing relationship of the outputs of various of the circuit components of FIG. 2*a* and 2*b* during the four sampling intervals indicated in FIG. 5.

Operation of the system of the invention in response to a false peak may be understood with reference to FIGS. 2, 5 and 6. FIG. 5 graphically defines the nature of a false peak. A false peak is created when, either because of instabilities in the circuits of the system or because of an actual temporary downward deviation (dashed line of FIG. 5) of the rising analog input signal, the signal level detected during a sampling interval III appears to be lower than that detected during sampling interval II while during the following interval it is found to be greater. By comparing the waveforms for the first three sampling intervals shown in FIG. 6 with those generated during the first three sampling intervals shown for detection of a normal peak in FIG. 4 it can be seen that operation of the system is identical during the first three sampling intervals in both situations.

However, in the false peak situation illustrated in FIGS. 5 and 6, the output of polarity detector 133 does not go positive at the beginning of sampling interval IV. This is because the detected magnitude of the analog input signal is greater than it was during interval II, causing the signal level on input line 109 of amplifier 131 to exceed the level on line 113. Therefore since the output of polarity detector 133 remains at its negative level at the beginning of interval IV, no output pulse can issue from AND 28 and consequently no gating pulse issues from AND 139 (see FIG. 6). The non-appearance of these two signals therefore precludes the opening of gating circuits 141, the setting of triggers 145 and 34 and the advancement of peak counter 16. Further, AND circuits 18 and 38 are not inhibited and the disparity between the magnitude of the analog input signal at input IN 1 and the magnitude represented at the output of data counter 14 causes AND 137 to gate pulses (FIG. 6) from oscillator 129 to advance counter 14 in the usual fashion. It is to be noted that the first such counter drive pulse appearing at the output of OR 22 resets the peak validating trigger 36. This restores the terminal circuits to the condition in which they existed prior to detection of the false peak, and enables the system to detect the ensuing true peak in the same fashion as previously described in connection with FIGS. 3 and 4.

It is thus seen that the analog to digital conversion system of the invention provides peak detection for a plurality of analog input signals in an extremely economical fashion by time-sharing the high-cost analog-digital conversion components, i.e., DAC network 111, differential amplifier 131, polarity detector 133 and oscillator 129 among a plurality of low-cost input terminals each associated with a different one of the analog input signals. In terms of the previously discussed exemplary application of the system wherein it is employed to generate output data for a plurality of automatic biological fluid analyzing systems, the data transmitted on output cable 101 to the recorder 200 contains a digital representation of the magnitude of each detected peak, together with the necessary identification data to relate the peak magnitude to a particular analyzing system and to a particular specimen handled by that system. The latter two items of information are contained in the terminal number code and in the peak number code, respectively.

However, it is readily apparent that the basic teaching of the invention may be applied to a wide variety of different analog-digital conversion situations, including those which require a peak detection function and those which call for a straight analog-digital conversion through use of a tracking (up-down) counter. Also, the number of input terminals need not be limited to four nor need the data counter and peak counter be limited to the six position and four position binary configurations shown. Further, scanning switches 105 and 106 may well be replaced with electronic switching circuits performing the same functions as the mechanical stepping switches described.

While the invention has been particularly shown and described with reference to a preferred embodiment thereof, it will be understood by those skilled in the art that the foregoing and other changes in form and details may be made therein without departing from the spirit and scope of the invention.

We claim:

1. In a device for detecting and measuring extrema of a variable analog input signal, the combination comprising:

a unidirectional counter having a plurality of interconnected stages with a low-order stage thereof being adapted to receive a series of incrementing drive pulses, said counter having an output adapted to store a digital representation indicative of a total number of said incrementing pulses received by said low-order stage;

a digital to analog converter responsive to said digital representation to generate a proportional analog signal therefrom;

comparison means responsive to the magnitude of said proportional analog signal and to the magnitude of said analog input signal for generating a polarity output having a first polarity indicating that a predetermined one of said magnitudes is greater than the other of said magnitudes;

incrementing means for supplying said drive pulses to said low-order counter stage as long as said first polarity is present, whereby said digital representation changes only when said one magnitude is greater than said other magnitude;

a storage register;

first control means responsive to said polarity output to produce a gating pulse when said output is indicative of a polarity opposite said first polarity; and gating means responsive to said gating pulse to transfer a digital representation equivalent to that stored in said counter to said storage register.

2. The device of claim 1, further comprising:

an additional unidirectional counter for storing an additional digital representation associated with an additional analog input signal; and switching means for sequentially applying each of said analog input signals to said comparison means, for sequentially applying said drive pulses to each of said counters, and for sequentially applying each of said digital representations to said digital to analog converter.

3. The device of claim 1 further comprising:
second control means responsive to said polarity output at substantially the beginning of a sampling interval for generating a control pulse when said polarity output is of said opposite polarity;
a bistable device settable to a first output state by said control pulse and resettable to a second output state by said gating pulse; and
means rendering said first control means responsive to the coincidence of said polarity output and said first output state of said bistable device at substantially the beginning of a sampling interval, whereby said first control means generates said gating pulse only upon the detection of said polarity output to be indicative of said opposite polarity for at least two consecutive sampling intervals.

4. The device of claim 1 further comprising:
means for resetting said counter in response to said gating pulse after said stored counter representation has been transferred to said storage register;
a bistable device settable to a first output state by said gating pulse and resettable to a second output state when said counter reaches a predetermined count;
means enabled by said first output state of said bistable device for supplying secondary drive pulses to said counter, one said secondary drive pulse being generated each sampling interval; and
inhibit means responsive to said first output state of said bistable device for inhibiting the application of said first drive pulses to said counter and for inhibiting the operation of said digital to analog converter, said inhibit means being further responsive to said first output state of said bistable device to cause said counter to switch to a count of zero in response to the secondary drive pulse following the secondary drive pulse which switches said counter to said predetermined count.

5. The device of claim 1 further comprising:
external utilization means for utilizing the digital representation stored in said storage register and for generating a control pulse after said utilization is completed;
a bistable device settable to a first output state by said gating pulse and resettable to a second output state by said control pulse; and
means inhibiting the application of said gating pulse to said gating means when said bistable device is in said first output state.

6. The device of claim 1 further comprising:
a second counter;
means connecting the outputs of said second counter to said gating means whereby the digital representation stored in said second counter is transferred to said storage register together with the digital representation stored in said first counter; and
means for incrementing said second counter in response to said gating pulse.

7. In a device for generating digital approximations from a plurality of analog input signals, the combination comprising:
a plurality of counters adapted to receive incrementing drive pulses and having outputs adapted to store digital representations associated with respective ones of said analog input signals;
a digital to analog converter responsive to a digital input to generate a proportional analog signal therefrom;
comparison means responsive to the magnitude of said proportional analog signal and to the magnitude of one of said analog input signals for generating a polarity output having a first polarity indicating that a predetermined one of said magnitudes is greater than the other of said magnitudes;
means responsive to said polarity output for supplying said drive pulses; and
switching means adapted, during a plurality of sampling intervals, sequentially to couple said digital to analog converter input to the output of each one of said counters, to couple said drive pulses to said one counter, and to couple said comparison means to the analog input signal associated with said one counter.

8. The device of claim 7, further comprising means for inhibiting the receipt of said drive pulses by said one counter in response to an indication from said comparison means of a polarity opposite said first polarity.

9. The device of claim 8 wherein each of said counters is a unidirectional counter having a plurality of interconnected stages, a low-order one of said stages being adapted to receive all of said drive pulses applied to said counter.

10. The device of claim 8, further comprising:
a storage register;
first control means responsive to said polarity output substantially at the beginning of each of said sampling intervals to produce a gating pulse when said polarity output indicates the presence of said opposite polarity; and
gating means responsive to said gating pulse to transfer to said storage register a digital representation equivalent to that stored in said one counter.

11. The device of claim 10 further comprising:
second control means responsive to said polarity output at substantially the beginning of each of said intervals for generating a control pulse when said polarity output is of said opposite polarity;
a bistable device settable to a first output state by said control pulse and resettable to a second output state by said gating pulse; and
means rendering said first control means responsive to the coincidence of said polarity output and said first output state of said bistable device at substantially the beginning of each of said sampling intervals, whereby said first control means generates said gating pulse only upon the detection of said polarity output to be indicative of said opposite polarity for at least two consecutive sampling intervals.

12. The device of claim 10 further comprising:
means for resetting said counter in response to said gating pulse after said stored counter representation has been transferred to said storage register;
a bistable device settable to a first output state by said gating pulse and resettable to a second output state when said counter reaches a predetermined count;
means enabled by said first output state of said bistable device for supplying secondary drive pulses to said counter, one said secondary drive pulse being generated each sampling interval; and
inhibit means responsive to said first output state of said bistable device for inhibiting the application of said first drive pulses to said counter and for inhibiting the operation of said digital to analog converter, said inhibit means being further responsive to said first output state of said bistable device to cause said counter to switch to a count of zero in response to the secondary drive pulse following the secondary drive pulse which switches said counter to said predetermined count.

13. The device of claim 10 further comprising:
external utilization means for utilizing the digital representation stored in said storage register and for generating a control pulse after said utilization is completed;
a bistable device settable to a first output state by said gating pulse and resettable to a second output state by said control pulse; and means inhibiting the application of said gating pulse to said gating means when said bistable device is in said first output state.

14. The device of claim 10 further comprising:

a further counter;

means connecting the outputs of said further counter to said gating means whereby the digital representation stored in said further counter is transferred to said storage register together with a digital representation stored in one of said plurality of counters; and means for incrementing said further counter in response to said gating pulse.

References Cited

UNITED STATES PATENTS

| | | | |
|---|---|---|---|
| 2,836,356 | 5/1958 | Forrest et al. | 340—347 |
| 3,062,442 | 11/1962 | Boensel et al. | 340—347 |
| 3,187,323 | 6/1965 | Flood et al. | 340—347 |
| 3,216,003 | 11/1965 | Funk et al. | 340—347 |

MAYNARD R. WILBUR, Primary Examiner

J. GLASSMAN, Assistant Examiner